US008097673B2

(12) United States Patent  (10) Patent No.: US 8,097,673 B2
Jones  (45) Date of Patent: Jan. 17, 2012

(54) AQUEOUS FLUOROPOLYMER DISPERSION STABILIZED WITH AMINE OXIDE SURFACTANT AND PROCESS FOR MAKING COAGULATED FLUOROPOLYMER RESIN

(75) Inventor: Clay Woodward Jones, Fort Collins, CO (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/097,151

(22) Filed: Apr. 29, 2011

(65) Prior Publication Data

US 2011/0207905 A1 Aug. 25, 2011

Related U.S. Application Data

(62) Division of application No. 12/687,905, filed on Jan. 15, 2010, now Pat. No. 7,956,120, which is a division of application No. 11/876,944, filed on Oct. 23, 2007, now Pat. No. 7,956,112.

(60) Provisional application No. 60/872,750, filed on Dec. 4, 2006.

(51) Int. Cl.
    *C08F 6/22* (2006.01)
    *C08L 27/18* (2006.01)
(52) U.S. Cl. ........ 524/546; 526/255; 526/206; 524/236; 524/612; 528/401
(58) Field of Classification Search ................ 524/546, 524/236, 612; 526/255, 206; 528/401
    See application file for complete search history.

(56) References Cited

U.S. PATENT DOCUMENTS

| 2,559,752 A | 7/1951 | Berry |
| 3,037,953 A | 6/1962 | Marks et al. |
| 3,215,741 A | 11/1965 | Chadwick |
| 3,283,007 A | 11/1966 | Chadwick |
| 3,536,643 A | 10/1970 | Stryker et al. |
| 3,882,153 A | 5/1975 | Seki et al. |
| 4,282,162 A | 8/1981 | Kuhls |
| 4,369,266 A | 1/1983 | Kuhls et al. |
| 4,380,618 A | 4/1983 | Khan et al. |
| 4,576,869 A | 3/1986 | Malhotra |
| 5,219,910 A | 6/1993 | Stahl et al. |
| 5,240,990 A | 8/1993 | Kallfass et al. |
| 5,272,186 A | 12/1993 | Jones |
| 5,965,656 A | 10/1999 | Yamamoto et al. |
| 6,153,688 A | 11/2000 | Miura et al. |
| 6,177,533 B1 | 1/2001 | Woodward |
| 6,465,041 B1 | 10/2002 | Frisk et al. |
| 6,703,068 B2 | 3/2004 | Hintzer et al. |
| 6,833,403 B1 * | 12/2004 | Bladel et al. ............... 524/458 |
| 6,838,078 B2 * | 1/2005 | Wang et al. ............ 424/78.02 |
| 2003/0114576 A1 * | 6/2003 | Hintzer et al. ............... 524/495 |
| 2003/0130393 A1 | 7/2003 | Cavanaugh et al. |
| 2003/0158310 A1 | 8/2003 | Asano et al. |
| 2006/0151391 A1 | 7/2006 | Nakaya et al. |

FOREIGN PATENT DOCUMENTS

| EP | 0 229 340 B1 | 3/1991 |
| EP | 1 174 484 A1 | 1/2002 |
| WO | 98/20055 | 5/1998 |

* cited by examiner

*Primary Examiner* — Robert D. Harlan

(57) ABSTRACT

An aqueous fluoropolymer dispersion comprising an aqueous medium, fluoropolymer particles, and an amine oxide surfactant. Coagulated fluoropolymer resin is produced from the dispersion by adding an acidic reagent in sufficient amount to cause coagulation and separation of the coagulated fluoropolymer resin from the aqueous medium. Another particulate component such as particular polymer, filler, pigment, solid lubricant, etc., may be added to the dispersion and co-coagulated to form a mixture of coagulated fluoropolymer resin and particulate component.

19 Claims, No Drawings

AQUEOUS FLUOROPOLYMER DISPERSION STABILIZED WITH AMINE OXIDE SURFACTANT AND PROCESS FOR MAKING COAGULATED FLUOROPOLYMER RESIN

FIELD OF INVENTION

The present invention relates to aqueous fluoropolymer dispersion and more particularly relates to aqueous fluoropolymer dispersion comprising amine oxide surfactant and a process for making coagulated fluoropolymer resin from such dispersion.

BACKGROUND OF THE INVENTION

Fluoropolymer dispersions have a wide variety of end uses. For coating end uses, coating compositions containing fluoropolymer dispersion are applied to any of a variety of substrates in order to confer release, chemical and heat resistance, corrosion protection, cleanability, low flammability, and weatherability. Fluoropolymer dispersions for coating use are usually in a concentrated form and typically are stabilized with a significant quantity of a nonionic surfactant such as an alkyl phenol ethoxylate or an aliphatic alcohols ethoxylate as taught in U.S. Pat. No. 3,037,953 to Marks et al., U.S. Pat. No. 6,153,688 to Miura et al., and U.S. 2003/0130393 to Cavanaugh et al.

For some specialized fluoropolymer dispersions, the presence of nonionic surfactants such as alkyl phenol ethoxylates or aliphatic alcohols ethoxylates is not desirable. One such type of dispersion is generally referred to as "raw" dispersion (also referred to as "unstabilized" dispersion) because no surfactant other than the fluorosurfactant used in polymerization is added. In some processes, raw dispersion is coagulated to obtain coagulated fluoropolymer resin which, in the case of polytetrafluoroethylene (PTFE) fluoropolymer, is referred to as fine powder. In other processes, the aqueous fluoropolymer dispersion is mixed with other materials, often in dispersion or slurry form, such as particulate polymers, fillers, pigments, solid lubricants, etc. and then the fluoropolymer is co-coagulated together with the other material. Conventional nonionic surfactants such as alkyl phenol ethoxylates or aliphatic alcohol ethoxylates are not used in coagulation processes because they generally confer high stability to the dispersion preventing or making coagulation difficult. In some processes where coagulation does succeed, the result is an undesirable sticky or fibrillated product which is difficult to process into a finished article.

In the manufacture of fluoropolymer dispersions, anionic fluorosurfactant is typically used as a polymerization aid in the dispersion polymerization process, the anionic fluorosurfactant functioning as a non-telogenic dispersing agent. For example, an early description of this use of anionic fluorosurfactant in dispersion polymerization is found in U.S. Pat. No. 2,559,752 to Berry. Because of environmental concerns and because anionic fluorosurfactants are expensive, processes have been developed for reducing and recovering anionic fluorosurfactant from aqueous fluoropolymer dispersions.

One common method to reduce anionic fluorosurfactant is by adsorption onto an ion exchange resin as taught in U.S. Pat. No. 3,536,643 (Stryker); U.S. Pat. No. 3,882,153 (Seki et al); U.S. Pat. No. 4,282,162 (Kuhls) and U.S. Pat. No. 6,833,403 (Bladel et al.) For fluorosurfactant reduction, fluoropolymer dispersions are generally stabilized with the same nonionic surfactants that are employed for coating end uses, i.e., alkyl phenol ethoxylates or aliphatic alcohol ethoxylates. However, if it is attempted to use an anion exchange process for fluorosurfactant reduction of raw fluoropolymer dispersions, premature coagulation of the dispersion will result. Such premature coagulation of the raw dispersion occurs because the dispersion is stabilized only by the presence of anionic fluorosurfactant which is being removed in the anion exchange process.

Improved aqueous fluoropolymer dispersions are desired which are especially suitable for end use applications which produce coagulated fluoropolymer resin from the dispersion.

BRIEF SUMMARY OF THE INVENTION

The invention is based on the discovery that amine oxide surfactants provide good stabilization for fluoropolymer dispersions and that acidic reagents when added to the dispersions reduce dispersion stability and enable the fluoropolymer dispersions to be coagulated.

In accordance with the invention, an aqueous fluoropolymer dispersion is provided which comprises an aqueous medium, fluoropolymer particles, and an amine oxide surfactant of the formula:

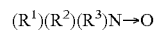

wherein $R^1$ is radical of the formula:

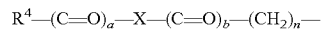

wherein $R^4$ is a saturated or unsaturated, branched or unbranched, cyclic or acyclic, alkyl, hydroxyalkyl, ether or hydroxyether radical having 1 to 20 carbon atoms, X is an O, NH or $NR^5$, a and b are 0 or 1 with the proviso that a+b=1, and n is 2-6;

wherein $R^2$ and $R^3$ are independently selected from saturated or unsaturated, branched or unbranched, cyclic or acyclic, alkyl, hydroxyalkyl, ether or hydroxyether radical having 1 to 10 carbon atoms optionally substituted with halogen;

$R^5$ is selected from saturated or unsaturated, branched or unbranched, cyclic or acyclic, alkyl, hydroxyalkyl, ether or hydroxyether radical having 1 to 10 carbon atoms optionally substituted with halogen or an N-oxylamino group; and wherein that $R^2$ and $R^3$ may be joined by a chemical bond to form a ring.

The invention also provides a process for producing a coagulated fluoropolymer resin comprising providing an aqueous fluoropolymer dispersion comprising an aqueous medium, fluoropolymer particles, and an amine oxide surfactant. An acidic reagent is added to the dispersion in sufficient amount to coagulate the fluoropolymer particles to produce coagulated fluoropolymer resin. The coagulated fluoropolymer resin is then separated from the aqueous medium. In a preferred form of the process of the invention, process further comprises agitating the dispersion. Preferably, the process further comprises drying said coagulated fluoropolymer resin.

In accordance with another preferred form of the invention, the process further comprises adding a particulate component such as a particulate polymer, filler, pigment, solid lubricant, etc., to the aqueous dispersion prior to adding the acidic reagent. In this form of the invention, the acidic reagent causes co-coagulation of the fluoropolymer particles and the particulate component. Preferably, the particulate component is added to the dispersion as a dispersion or a slurry in an aqueous medium.

DETAILED DESCRIPTION OF THE INVENTION

Fluoropolymers

The aqueous fluoropolymer dispersion in accordance with the present invention is made by dispersion polymerization (also known as emulsion polymerization). Fluoropolymer dispersions are comprised of particles of polymers made from monomers wherein at least one of the monomers contains fluorine, i.e., a fluorinated monomer, preferably an olefinic monomer with at least one fluorine or a perfluoroalkyl group attached to a doubly-bonded carbon. The fluorinated monomer used in the process of this invention is preferably selected from the group consisting of tetrafluoroethylene (TFE), hexafluoropropylene (HFP), chlorotrifluoroethylene (CTFE), trifluoroethylene, hexafluoroisobutylene, perfluoroalkyl ethylene, fluorovinyl ethers, vinyl fluoride (VF), vinylidene fluoride (VF2), perfluoro-2,2-dimethyl-1,3-dioxole (PDD) and perfluoro-2-methylene-4-methyl-1,3-dioxolane (PMD). A preferred perfluoroalkyl ethylene monomer is perfluorobutyl ethylene (PFBE). Preferred fluorovinyl ethers include perfluoro(alkyl vinyl ether) monomers (PAVE) such as perfluoro (propyl vinyl ether) (PPVE), perfluoro (ethyl vinyl ether) (PEVE), and perfluoro (methyl vinyl ether) (PMVE). Non-fluorinated olefinic comonomers such as ethylene and propylene can be copolymerized with fluorinated monomers. A preferred class of fluoropolymers are homopolymers and copolymers of tetrafluoroethylene (TFE).

Preferred fluoropolymer particles in the dispersion employed in this invention are non-melt-processible particles of polytetrafluoroethylene (PTFE) including modified PTFE which is not melt-processible. Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than about 1 wt %, more preferably less than about 0.5 wt %. A minimum amount of at least about 0.05 wt % is preferably used to have significant effect. The modified PTFE preferably contains a comonomer modifier which improves film forming capability during baking (fusing), such as perfluoroolefin, notably hexafluoropropylene (HFP) or perfluoro(alkyl vinyl) ether (PAVE), where the alkyl group contains 1 to 5 carbon atoms, with perfluoro(ethyl vinyl) ether (PEVE) and perfluoro(propyl vinyl) ether (PPVE) being preferred. Chlorotrifluoroethylene (CTFE), perfluorobutyl ethylene (PFBE), or other monomer that introduces bulky side groups into the molecule are also included. In this preferred form of the invention, the PTFE or modified PTFE typically has a melt creep viscosity of at least $1 \times 10^8$ Pa·s. The resins in the dispersion used in this form of the invention when coagulated and dried are thus non-melt-processible.

By non-melt-processible, it is meant that no melt flow is detected when tested by the standard melt viscosity determining procedure for melt-processible polymers. This test is according to ASTM D-1238-00 modified as follows: The cylinder, orifice and piston tip are made of corrosion resistant alloy, Haynes Stellite 19, made by Haynes Stellite Co. The 5.0 g sample is charged to the 9.53 mm (0.375 inch) inside diameter cylinder which is maintained at 372° C. Five minutes after the sample is charged to the cylinder, it is extruded through a 2.10 mm (0.0825 inch diameter), 8.00 mm (0.315 inch) long square-edge orifice under a load (piston plus weight) of 5000 grams. This corresponds to a shear stress of 44.8 KPa (6.5 pounds per square inch). No melt extrudate is observed.

In one preferred embodiment of the invention, the fluoropolymer particles are of high molecular weight polytetrafluoroethylene (PTFE) or modified polytetrafluoroethylene which, in fine powder form, are useful for the manufacture of paste extruded shapes that can be stretched rapidly in the unsintered state to form a high tensile strength PTFE fiber or expanded PTFE sheets or membranes. Processes for making dispersions containing PTFE or modified PTFE of this type are disclosed in Malhotra, U.S. Pat. No. 4,576,869, and Jones, U.S. Pat. No. 6,177,533 B1.

The preferred non-melt-processible PTFE or modified PTFE have a standard specific gravity (SSG) of about 2.13 to about 2.50. Preferably, the SSG is less than about 2.40, more preferably less than about 2.30, and most preferably less than about 2.25. The SSG is generally inversely proportional to the molecular weight of PTFE or modified PTFE.

The fluoropolymer particles in the dispersion used in this invention have a number average particle size of about 10 nm to about 400 nm, preferably, about 100 nm to about 350 nm.

The invention is also useful for dispersions of melt-processible fluoropolymers. By melt-processible, it is meant that the polymer can be processed in the molten state (i.e., fabricated from the melt into shaped articles such as films, fibers, and tubes etc. that exhibit sufficient strength and toughness to be useful for their intended purpose). Examples of such melt-processible fluoropolymers include homopolymers such as polychlorotrifluoroethylene or copolymers of tetrafluoroethylene (TFE) and at least one fluorinated copolymerizable monomer (comonomer) present in the polymer usually in sufficient amount to reduce the melting point of the copolymer substantially below that of TFE homopolymer, polytetrafluoroethylene, e.g., to a melting temperature no greater than 315° C.

A melt-processible TFE copolymer typically incorporates an amount of comonomer into the copolymer in order to provide a copolymer which has a melt flow rate (MFR) of about 1-100 g/10 min as measured according to ASTM D-1238 at the temperature which is standard for the specific copolymer. Preferably, the melt viscosity is at least about $10^2$ Pa·s, more preferably, will range from about $10^2$ Pa·s to about $10^6$ Pa·s, most preferably about $10^3$ to about $10^5$ Pa·s measured at 372° C. by the method of ASTM D-1238 modified as described in U.S. Pat. No. 4,380,618. Additional melt-processible fluoropolymers are the copolymers of ethylene or propylene with TFE or CTFE, notably ETFE, ECTFE and PCTFE.

A preferred melt-processible copolymer for use in the practice of the present invention comprises at least about 40-98 mol % tetrafluoroethylene units and about 2-60 mol % of at least one other monomer. Preferably the other monomer is a perfluorinated monomer. Preferred comonomers with TFE are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE, MFA (TFE/PMVE/PAVE wherein the alkyl group of PAVE has at least two carbon atoms) and THV (TFE/HFP/VF2).

A typical process for the aqueous dispersion polymerization of preferred PTFE polymer is a process wherein TFE vapor is fed to a heated reactor containing fluorosurfactants, paraffin wax and deionized water. A chain transfer agent may also be added if it is desired to reduce the molecular weight of the PTFE. A free-radical initiator solution is added and, as the polymerization proceeds, additional TFE is added to maintain the pressure. The exothermic heat of reaction is removed by circulating cooling water through the reactor jacket. After several hours, the feeds are stopped, the reactor is vented and purged with nitrogen, and the raw dispersion in the vessel is transferred to a cooling vessel. Paraffin wax is removed and the dispersion is isolated and stabilized with dispersing agent.

The fluorosurfactant used in the manufacture of the dispersion is a non-telogenic, anionic dispersing agent, soluble in water and comprising an anionic hydrophilic group and a hydrophobic portion. Preferably, the hydrophobic portion is an aliphatic fluoroalkyl group containing at least four carbon atoms and bearing fluorine atoms and having no more than two carbon atoms not bearing fluorine atoms adjacent to the hydrophilic group. These fluorosurfactants are used as a polymerization aid for dispersing and, because they do not chain transfer, they do not cause formation of polymer with undesirable short chain length. An extensive list of suitable fluorosurfactants is disclosed in U.S. Pat. No. 2,559,752 to Berry. Preferably, the fluorosurfactant is a perfluorinated carboxylic or sulfonic acid having 6-10 carbon atoms and is typically used in salt form. Suitable fluorosurfactants are ammonium perfluorocarboxylates, e.g., ammonium perfluorocaprylate or ammonium perfluorooctanoate. The fluorosurfactants are usually present in the amount of 0.02 to 1 wt % with respect to the amount of polymer formed. The fluorinated surfactant is used to aid the polymerization process but the amount remaining in the dispersion is significantly reduced as will be explained below.

The initiators preferably used to make dispersion of this invention are free radical initiators. They may be those having a relatively long half-life, preferably persulfates, e.g., ammonium persulfate or potassium persulfate. To shorten the half-life of persulfate initiators, reducing agents such as ammonium bisulfite or sodium metabisulfite, with or without metal catalysis salts such as Fe (III), can be used. Alternatively, short half-life initiators such as potassium permanganate/oxalic acid can be used.

In addition to the long half-life persulfate initiators, small amounts of short chain dicarboxylic acids such as succinic acid or initiators that produce succinic acid such as disuccinic acid peroxide (DSP) may be also be added in order to reduce coagulum The dispersion polymerization of melt-processible copolymers is similar except that comonomer in significant quantity is added to the batch initially and/or introduced during polymerization. Chain transfer agents are typically used in significant amounts to decrease molecular weight to increase melt flow rate.

Amine Oxide Surfactants

Amine oxide surfactants are employed in accordance with the invention to provide stabilization for the aqueous fluoropolymer dispersions and to be selectively destabilized by the addition of an acidic reagent. In aqueous fluoropolymer dispersion compositions in accordance with the invention and in accordance with preferred amine oxide surfactants for use in the process of the invention, amine oxide surfactants of the formula are employed:

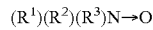

wherein $R^1$ is radical of the formula:

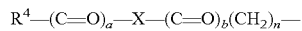

wherein $R^4$ is a saturated or unsaturated, branched or unbranched, cyclic or acyclic, alkyl, hydroxyalkyl, ether or hydroxyether radical having 1 to 20 carbon atoms, X is an O, NH or $NR^5$, a and b are 0 or 1 with the proviso that a+b=1, and n is 2-6;

wherein $R^2$ and $R^3$ are independently selected from saturated or unsaturated, branched or unbranched, cyclic or acyclic, alkyl, hydroxyalkyl, ether or hydroxyether radical having 1 to 10 carbon atoms optionally substituted with halogen;

$R^5$ is selected from saturated or unsaturated, branched or unbranched, cyclic or acyclic, alkyl, hydroxyalkyl, ether or hydroxyether radical having 1 to 10 carbon atoms optionally substituted with halogen or an N-oxylamino group; and wherein that $R^2$ and $R^3$ may be joined by a chemical bond to form a ring.

If $R^2$, $R^3$ $R^4$ and $R^5$ have halogen substitutions, preferably halogen substitutions are limited such that no more than about 70% of the atoms attached to carbon atoms of the radical are halogen atoms, more preferably no more than about 50% are halogen atoms. Most preferably, $R^2$, $R^3$ $R^4$ and $R^5$ are not halogen substituted.

If $R^5$ is substituted with N-oxylamino, groups bonded to the nitrogen atom preferably have 1 to 10 carbon atoms.

In preferred surfactants, R1 is a radical of the formula

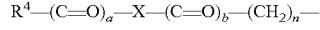

wherein $R^4$ comprises alkyl having 1-20 carbon atoms, X is NH, a and b are 0 or 1 with the proviso that a+b=1, and n is 2-4;

In more preferred surfactants, R1 is a radical of the formula:

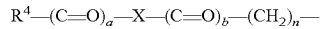

wherein $R^4$ comprises alkyl having 5-20 carbon atoms, X is NH, a and b are 0 or 1 with the proviso that a+b=1, and n is 3.

In preferred surfactants, $R^2$ and $R^3$ in the formula above are independently selected from saturated or unsaturated, branched or unbranched, cyclic or acyclic, alkyl or hydroxyalkyl radical having 1 to 4 carbon atoms.

In more preferred surfactants, $R^2$ and $R^3$ in the formula above are each independently selected from alkyl or hydroxyalkyl radicals having 1 to 2 carbon atoms.

Preferred surfactants useful for the practice of the present invention are cocoamidopropyl dimethyl amine oxide, 2-ethylhexylamidopropyl dimethyl amine oxide, and octylamidopropyl dimethyl amine oxide.

Dispersions

To produce dispersion in accordance with the invention, amine oxide surfactant as described above is added in sufficient quantity to the dispersion after polymerization to stabilize the dispersion for the intended processing. Preferably, the stability provided enables the dispersion to be treated to reduce fluorosurfactant content such as by anion exchange as discussed hereinafter. In addition, for use in accordance with the process of the invention, the amount and type of amine oxide surfactant is selected to enable the dispersion to be coagulated by addition of an acidic reagent.

The amine oxide surfactant can be added to the dispersion anytime after polymerization but prior to fluorosurfactant reduction as discussed in more detail hereinafter. Usually, the amine oxide surfactant is added prior to concentration if concentration is to be performed. Concentration is discussed in more below.

The aqueous dispersions in accordance with the invention preferably range in fluoropolymer solids content from about 10 to about 70 wt %, more preferably 25 to about 70 wt %. The amount of amine oxide surfactant is preferably selected based on the amount of fluoropolymer solids. The aqueous fluoropolymer dispersions in accordance with the invention preferably contain amine oxide surfactant in an amount of about 0.05 to about 15 wt % based on the weight of fluoropolymer solids. More preferably, the aqueous fluoropolymer dispersion is present in an amount of about 0.1 to about 10 wt %, most preferably 0.5 to about 5 wt %, based on the weight of fluoropolymer solids. For coagulation end uses, the exact amount of amine oxide surfactant in a particular dispersion should be selected to provide stability during processing but permit coagulation when desired. As discussed in more detail hereinafter, the amount of amine oxide surfactant may need to be adjusted for end uses in which particulate component is to be co-coagulated together with the fluoropolymer.

The size of the fluoropolymer particles in the aqueous fluoropolymer dispersion is determined by the polymerization procedure used to make the dispersion. Preferred dispersions have a number average particle size of about 10 to about 400 nm.

The dispersions in accordance with the invention preferably have reduced anionic fluorosurfactant content, preferably at a level no greater than about 300 ppm, more preferably no greater than about 100 ppm, most preferably no greater than about 50 ppm.

Dispersion Shear Stability—Gel Time

The dispersion preferably has a Gel Time of at least 100 seconds as determined by the Gel Time test described in the Test Methods of this application. Gel Time is a measurement of resistance of the dispersion to coagulation under high shear conditions and thus is an indicator of the stability of the dispersion during processing which subjects the dispersion to shear. Although affected by a variety of factors including solids content, pH, molecular weight of the polymer, polymer particle morphology, other materials in the dispersion, etc., a Gel Time of at least 100 indicates that the amine oxide surfactant is functioning to stabilize the polymer sufficiently for normal handling and processing, e.g., is sufficiently stabilized for fluorosurfactant removal in an anion exchange column. More preferably, the Gel Time is at least about 300 seconds, even more preferably at least about 500 seconds, even more preferably at least about 1000 seconds, and most preferably at least about 1500 seconds. A preferred range of Gel Time provided by the present invention is about 100 seconds to about 2000 seconds. In accordance with a preferred form of the invention, the dispersion contains less that about 300 ppm fluorosurfactant based on the weight of the dispersion and has the Gel Times as indicated above. Preferably, the Gel Times described above are observed when the fluorosurfactant content is less that about 100 ppm, most preferably less that about 50 ppm.

The preferred dispersions in accordance with the invention also have long storage stability and can be stored at least about 2 weeks without any significant coagulation or degradation. More preferably, the dispersions are stable for storage at least about 2 months.

Fluorosurfactant Reduction

In the practice of the present invention, it is preferable for the anionic fluorosurfactant content of the aqueous fluoropolymer dispersion to be reduced to a predetermined level, preferably a level no greater than about 300 ppm, more preferably no greater than about 100 ppm, most preferably no greater than about 50 ppm.

The fluorosurfactant content can be reduced by any of a variety of procedures as known in the art. With stabilization being provided by amine oxide surfactant, the fluorosurfactant can be advantageously removed by adsorption onto an anion exchange resin without coagulation of the dispersion occurring. Any of a variety of techniques which bring the dispersion in contact with the anion exchange resin can be used to carry out the ion exchange of the process. For example, the process can be carried out by addition of ion exchange resin bead to the dispersion in a stirred tank, in which a slurry of the dispersion and resin is formed, followed by separation of dispersion from the anion exchange resin beads by filtration. Another suitable method is to pass the dispersion through a fixed bed of anion exchange resin instead of using a stirred tank. Flow can be upward or downward through the bed and no separate separation step is needed since the resin remains in the fixed bed.

The contacting of the dispersion is performed at a temperature which is sufficiently high to facilitate the rate of ion exchange and to reduce the viscosity of the dispersion but being below a temperature at which the resin degrades at a detrimentally high rate or a viscosity increase in observed. Upper treatment temperature will vary with the type of polymer and amine oxide surfactant employed. Typically, temperatures will be between 20° C. and 80° C.

The fluorosurfactant can be recovered from the anion exchange resin if desired or the resin with the fluorosurfactant can be disposed of in an environmentally acceptable method, e.g., by incineration. If it is desired to recover the fluorosurfactant, the fluorosurfactant may be removed from resin by elution. Elution of fluorosurfactant adsorbed on the anion exchange resin is readily achieved by use of ammonia solution as demonstrated by Seki in U.S. Pat. No. 3,882,153, by a mixture of dilute mineral acid with organic solvent (e.g., HCl/ethanol) as demonstrated by Kuhls in U.S. Pat. No. 4,282,162, or by strong mineral acids such as sulfuric acid and nitric, transferring the adsorbed fluorinated carboxylic acid to the eluent. The fluorosurfactant in the eluent in high concentration can easily be recovered in the form of a pure acid or in the form of salts by common methods such as acid-deposition, salting out, and other methods of concentration, etc.

Ion Exchange Resins

The ion exchange resins for use in accordance with reducing the fluorosurfactant content of the aqueous dispersion used in the present invention include anionic resins but can also include other resin types such as cationic resins, e.g., in a mixed bed. The anionic resins employed can be either strongly basic or weakly basic. Suitable weakly basic anion exchange resins contain primary, secondary amine, or tertiary amine groups. Suitable strongly basic anion exchange resin contain quaternary ammonium groups. Although weakly basic resins are useful because they can be regenerated more easily, strongly basis resins are preferred when it is desired to reduce fluorosurfactant to very low levels and for high utilization of the resin. Strongly basic ion exchange resins also have the advantage of less sensitivity to the pH of the media. Strong base anion exchange resins have an associated counter ion and are typically available in chloride or hydroxide form but are readily converted to other forms if desired. Anion exchange resins with hydroxide, chloride, sulfate, and nitrate can be used for the removal of the fluorosurfactant but anion exchange resins in the form of hydroxide are preferred to prevent the introduction of additional anions and to increase pH during anion exchange because a high pH, i.e., greater than 9, is desirable in the product prior to shipping to inhibit bacterial growth. Examples of suitable commercially-available strong base anion exchange resins with quaternary ammonium groups with a trimethylamine moiety include DOWEX® 550A, US Filter A464-OH, SYBRON M-500-OH, SYBRON ASB1-OH, PUROLITE A-500-OH, Itochu TSA 1200, AMBERLITE® IR 402. Examples of suitable commercially-available strong base anion exchange resins with quaternary ammonium groups with a dimethyl ethanol amine moiety include US Filter A244-OH, AMBERLITE® 410, DOWEX® MARATHON A2, and DOWEX® UPCORE Mono A2.

Ion exchange resin used to reduce fluorosurfactant for use in the process of the present invention is preferably monodisperse. Preferably, the ion exchange resin beads have a number average size distribution in which 95% of the beads have a diameter within plus or minus 100 μm of the number average bead diameter.

Concentration

If concentration of the dispersions of this invention is desired, any of a variety of known methods can be used. If an amine oxide surfactant is employed which has a cloud point in a practical temperature range for concentration, i.e., about 30° C. and about 90° C., concentration can be performed as taught in Marks et al., U.S. Pat. No. 3,037,953. Other known methods can be practiced if desired and can be used when the amine oxide surfactant does not have a suitable cloud point. Ultrafiltration as taught in Kuhls, U.S. Pat. No. 4,369,266, can be used. Another suitable method is concentration using acrylic polymers of high acid content as described in U.S. Pat. No. 5,272,186 to Jones.

Process to Produce Coagulated Fluoropolymer Resin

The process of the invention produces coagulated fluoropolymer resin from aqueous fluoropolymer dispersions containing amine oxide surfactant. An acidic reagent, preferably a mineral acid or strong organic acid, is added to the dispersion in sufficient amount to coagulate the fluoropolymer particles to produce coagulated fluoropolymer resin. The coagulated fluoropolymer resin is then separated from the aqueous medium. In a preferred form of the process of the invention, process further comprises agitating the dispersion. Preferably, the process further comprises drying said coagulated fluoropolymer resin.

Coagulation of fluoropolymer dispersion in accordance with the invention preferably is accomplished by introducing the dispersion into a vessel equipped with an agitator suitable for providing suitable shear to the dispersion for mixing and assisting with coagulation. Turbine agitators are suitable for this purpose and may have pitched blades with the vertical displacement given to the dispersion being either up or down. If air entrainment is be minimized, vertical displacement upwards is generally desirable. With amine oxide surfactants, and particularly with the preferred amine oxide surfactants, the stability of the dispersion decreases with decreasing pH. It is preferably for the pH to be decreased together with suitable agitation for mixing. In addition, it is preferable for the acid to be added over time to allow good dispersal of the acid and it is usually desirable for the pH of the dispersion is gradually dropped. Preferably, the pH is adjusted to be acidic, i.e., a pH in the range of about 7 to about 0. Preferably, the pH is adjust to less than about 7, more preferably less than about 5, most preferably less than about 3. When the desired pH has been achieved, the agitation rate can be increased to effect the coagulation of the dispersion, optionally with the addition of more acid either continuously or by aliquots. Usually upon coagulation, the dispersion will separate into a floating polymer layer and a relatively clear water layer. The aqueous medium can be drained off, siphoned off, or otherwise separated from the polymer. Additional acidified water or fluoropolymer surface wetting solvents such as the lower alcohols can be contacted with the polymer one or more times to remove more of the adsorbed amine oxide surfactant if desired. Once a suitable amount of the amine oxide surfactant is removed, the polymer is separated from the bulk of water and or solvent, and the polymer is dried and can be used as desired.

In accordance with another preferred form of the invention, the process further comprises adding a particulate component such as a particulate polymer, filler, pigment, solid lubricant, etc., to the aqueous dispersion prior to adding the acidic reagent. In this form of the invention, the acidic reagent causes co-coagulation of the fluoropolymer particles and the particulate component. This form of the invention is advantageously used when it is desired to have an intimate mixture of the fluoropolymer and the particulate component. In such intimate mixtures, the particulate component is preferably uniformly distributed in the coagulated fluoropolymer resin such that the mixture is homogeneous. Preferred co-coagulated materials made in this process can be processed in, for example, paste extrusion processes similar to fine powder resin without additives.

For co-coagulation of the dispersion with another particulate component such as a particulate polymer, filler, pigment, solid lubricant, etc., it is usually desirable for the selected particulate component to be provided as a dispersion or as a slurry with water, preferably water containing surfactant. Solvents may also be present also is desired. Particulate components often have large and adsorptive surface areas that can absorb a surfactant and destabilize the dispersion causing premature co-coagulation, i.e., before intimate mixing is achieved. Accordingly, it may be desirable to treat the particulate component to prevent premature co-coagulation such as by contacting the particulate component with the same or different surfactant as is contained in the fluoropolymer dispersion, i.e., amine oxide. One way to achieve this is to provide an particulate component slurry or dispersion having the nearly the same or lower surface tension than that of the fluoropolymer dispersion. As discussed above for coagulation of the fluoropolymer alone, co-coagulation together the particulate component with can be achieved, in accordance with the invention, by addition of an acidic reagent. Preferably, the manner of addition of the acidic reagent and the pH range employed is the same as discussed above for the coagulation of the fluoropolymer resin alone. Preferably, agitation is also employed as discussed above. Ultimately, after washing if desired, the co-coagulated mixture is dried or otherwise used as desired.

Test Methods

Solids content of raw (as polymerized) fluoropolymer dispersion are determined gravimetrically by evaporating a weighed aliquot of dispersion to dryness, and weighing the dried solids. Solids content is stated in weight % based on combined weights of PTFE and water. Alternately solids content can be determined by using a hydrometer to determine the specific gravity of the dispersion and then by reference to a table relating specific gravity to solids content. (The table is constructed from an algebraic expression derived from the density of water and density of as polymerized PTFE.)

Number average dispersion particle size on raw dispersion is measured by photon correlation spectroscopy.

Standard specific gravity (SSG) of PTFE resin is measured by the method of ASTM D-4895. If a surfactant is present, it can be removed by the extraction procedure in ASTM-D-4441 prior to determining SSG by ASTM D-4895.

Surfactant Content is calculated based on the amount of amine oxide surfactant added to the dispersion and is reported as wt % based on fluoropolymer solids.

Fluorosurfactant Content is measured by a GC technique in which the fluorosurfactant is esterified with acidic methanol. Perfluoroheptanoic acid is used as an internal standard. Upon addition of electrolyte and hexane the ester is extracted into the upper hexane layer. The hexane layer is analyzed by injection onto a glass GC column of 20 ft.×2mm I.D. packed with 10% OV-210 on 70/80 mesh Chromosorb W.AW.D-MCS. held at 120 C. The detector is ECD and the carrier gas of 95% argon/5% methane has a flow rate of 20 to 30 ml/min. Fluorosurfactant content is reported as wt % based on dispersion weight.

Gel time is measured as the time it takes a dispersion to completely gel in a blender. 200 ml of dispersion is placed in a Waring commercial explosion resistant blender (Model 707SB, one quart size, run at high speed, air requirements— 10 scfm @ 10 psi, available from Waring of New Hartford, Connecticut). This blender has a capacity of 1 liter and has an air purge for the motor. The dispersion is stirred at the highest speed until the dispersion gels. The Gel Time is recorded is seconds. If the dispersion does not gel in ½ hour (1800 seconds), the test is terminated to avoid damage to the blender. The blender is then completely disassembled and cleaned after each determination.

EXAMPLES

Example 1

This example illustrates a dispersion stabilized with cocoamidopropyl dimethyl amine oxide and reduction of fluorosurfactant from the dispersion using an anion exchange procedure.

To a 2 liter glass resin kettle with cover having an internal diameter of 5 inches (12.5 cm) is added 540 ml of a PTFE dispersion of a high molecular weight resin of 40 wt % fluoropolymer solids having a fluorosurfactant content of 1328 ppm and a particle size of 270 nm. Also added to the kettle are 1420 ml of water, 20 ml of concentrated ammonium hydroxide (30 wt % as $NH_3$) and 6 g of cocoamidopropyl dimethyl amine oxide supplied by Jeen International as Jeechem 1770 having about 30 wt % active ingredient. The content of amine oxide surfactant is 0.83 wt % based on fluoropolymer solids. Two small ion nylon mesh bags each containing 15 g of A-244 OH Ion Exchange resin supplied by U.S. Filter Corporation attached to a 4 bladed agitator are suspended below the liquid surface. By means of a water bath the mixture was held at 50° C. and the mixture stirred at 20 rpm. After 2 days the dispersion mixture was removed from the kettle and found to have a fluorosurfactant content of 49.5 ppm and essentially no coagulum.

Example 2

This example illustrates a dispersion stabilized with 2-ethylhexylamidopropyl dimethyl amine oxide and reduction of fluorosurfactant from the dispersion using an anion exchange procedure.

The same conditions as example 1 are employed except that 40 ml of concentrated ammonium hydroxide (30 wt % as $NH_3$) is added and 15 g of 2-ethylhexylamidopropyl dimethyl amine oxide supplied by Isotet Chemical, LLC is used as the surfactant having 42.6 wt % active ingredient. The content of amine oxide surfactant is 2.95 wt % based on fluoropolymer solids. After 31 hours the dispersion is found to contain 40.5 ppm fluorosurfactant content and essentially no coagulum.

Example 3

This example illustrates a dispersion stabilized with octylamidopropyl dimethyl amine oxide and reduction of fluorosurfactant from the dispersion using an anion exchange procedure.

The same conditions as example 2 are employed except 15 g of octylamidopropyl dimethyl amine oxide supplied by Isotet Chemical, LLC having 44.3 wt % active ingredient is used as the surfactant (3.1 wt % based on fluoropolymer solids) and the temperature is held at 60 degrees C. After 2 days the dispersion is found to contain 18.2 ppm fluorosurfactant and essentially no coagulum.

Example 4

This example illustrates a dispersion stabilized with 2-ethylhexylamidopropyl dimethyl amine oxide and coagulation of PTFE resin from the dispersion with sulfuric acid.

800 ml of dispersion prepared as in Example 2 (after fluorosurfactant reduction) is placed in a 2 liter glass resin kettle equipped with stainless steel baffles. The apparatus consists of a 2 liter glass resin kettle of internal diameter of 13 cm, equipped with lid, baffles, a 4-bladed turbine agitator attached to a shaft, and a motor that rotates the shaft that passes through the lid. The baffles are a unit having an outer diameter of 12.7 cm, which slips into the kettle. The unit is comprised of 4 baffle blades of height 12.7 cm and 1.25 cm in width arranged equidistantly around on a wire ring. The agitator has a diameter of 7.5 cm and the blades are 1.4 cm wide. The blades have a pitch of 45 degrees and the shaft is rotated such that the agitator pumps upward. The agitator speed is set to 250 rpm and 3 ml of concentrated sulfuric acid is added to reduce the pH to less than about 3 and the dispersion begins to coagulate. The agitator speed is raised to 750 rpm to finish the coagulation. The liquid is decanted and the coagulated polymer is transferred to a large buchner funnel with fast filtering paper and the polymer is rinsed with water acidified with sulfuric acid. The polymer is removed and triturated in 2-propanol, the mixture again transferred to the buchner funnel to remove the solvent. This is repeated. The polymer is air dried and then dried at a temperature of 150° C. SSG testing yields a dark colored chip and measured SSG of 2.1605.

Example 5

This example illustrates a dispersion stabilized with 2-ethylhexylamidopropyl dimethyl amine oxide and coagulation of PTFE resin from the dispersion with nitric and phosphoric acid.

The dispersion prepared as in Example 2 (after fluorosurfactant reduction) is coagulated by the same technique as Example 4 except that 7 ml of nitric acid is used instead of sulfuric acid. The addition of the nitric acid yields a pH of 1-2 measured using pH indicating strips. The SSG chip still has some color but less than Example 4 and SSG measured 2.1612.

Using the dispersion of Example 2 (after fluorosurfactant reduction) but acidifying to a pH of 1-2 by use of 5 ml of phosphoric acid yields polymer with an SSG of 2.1581.

Example 6

This example illustrates on a larger scale a dispersion stabilized with cocoamidopropyl dimethyl amine oxide and reduction of fluorosurfactant from the dispersion using an anion exchange procedure.

To a 50 gallon stainless steel tank with steam heated jacket with lid is added 212.7 kg of a 23.5 wt % dispersion of high molecular weight resin, 1 L of concentrated ammonium hydroxide (30 wt % as $NH_3$), 1.5 kg of Jeechem 1770 (cocoamidopropyl dimethyl amine oxide, 30wt %) and 2 kg of water. The content of amine oxide surfactant is 0.9 wt % based on fluoropolymer solids. Affixed to the agitator is 28 nylon mesh bags containing a total of 4400 g of A-244 ion exchange resin. The agitator was turned at 10 rpm and the tank was held at 50 C for 2 days. The dispersion is discharged from the tank by siphoning. The resulting dispersion has a fluorosurfactant content of 50 ppm.

Example 7

This example illustrates a dispersion stabilized with cocoamidopropyl dimethyl amine oxide and coagulation of PTFE resin from the dispersion with nitric acid at various amine oxide surfactant levels.

The ability to coagulate to a fine powder from a dispersion of about 11.5 wt % PTFE solids with various loadings of cocoamidopropyl dimethyl amine oxide (AO) is tested using the dispersion prepared as in Example 6 using the same apparatus for coagulating fine powder dispersion as used in Example 4. Nitric acid addition reduces pH to less than 3.

Table 1 below shows the preparation of the dispersion and coagulation conditions.

TABLE 1

| Dispersion (g) | Water (g) | Added AO (g) | AO cont (Wt % PTFE Basis) | Nitric Acid (ml) | Max Agitation (RPM) | Time (min) |
|---|---|---|---|---|---|---|
| 250 | 270 | 0 | 0.9 | 9 | 800 | 8 |
| 250 | 270 | 0.5 | 1.1 | 15 | 1000 | 12.5 |
| 250 | 270 | 1.2 | 1.5 | 15 | 1000 | —* |

*did not coagulate

What is claimed is:

1. A process for producing a coagulated fluoropolymer resin comprising:
    providing an aqueous fluoropolymer dispersion comprising an aqueous medium, fluoropolymer particles having a number average particle size of about 10 to about 400 nm, and a surfactant for stabilization of the aqueous fluoropolymer dispersion which is selectively destabilized by the addition of an acidic reagent;
    adding an acidic reagent into said dispersion in sufficient amount to coagulate said fluoropolymer particles to produce coagulated fluoropolymer resin; and
    separating coagulated fluoropolymer resin from said aqueous medium.

2. The process of claim 1 wherein said acidic reagent is added into said dispersion in sufficient amount to reduce the pH to less than about 7.

3. The process of claim 1 further comprising agitating said dispersion.

4. The process of claim 1 further comprising drying said coagulated fluoropolymer resin.

5. The process of claim 1 further comprising adding a particulate component to said aqueous dispersion prior to adding said acidic reagent, said acidic reagent causing co-coagulation of said fluoropolymer particles and said particulate component.

6. The process of claim 5 wherein said particulate component is added to said dispersion as a dispersion or a slurry in an aqueous medium.

7. The process of claim 1 wherein said surfactant for stabilization of the aqueous fluoropolymer dispersion is an amine oxide.

8. The process of claim 7 wherein said amine oxide surfactant is of the formula:

$$(R^1)(R^2)(R^3)N \rightarrow O$$

wherein $R^1$ is a radical of the formula:

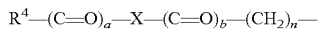

wherein $R^4$ is a saturated or unsaturated, branched or unbranched, cyclic or acyclic, alkyl, hydroxyalkyl, ether or hydroxyether radical having 1 to 20 carbon atoms, X is an O, NH or $NR^5$, a and b are 0 or 1 with the proviso that a+b=1, and n is 2-6;

wherein $R^2$ and $R^3$ are independently selected from saturated or unsaturated, branched or unbranched, cyclic or acyclic, alkyl, hydroxyalkyl, ether or hydroxyether radical having 1 to 10 carbon atoms, said radical optionally having halogen substitutions;

$R^5$ is selected from saturated or unsaturated, branched or unbranched, cyclic or acyclic, alkyl, hydroxyalkyl, ether or hydroxyether radical having 1 to 10 carbon atoms optionally substituted with halogen or an N-oxylamino group; and wherein that $R^2$ and $R^3$ may be joined by a chemical bond to form a ring.

9. The process of claim 8 wherein R1 is a radical of the formula

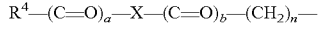

wherein $R^4$ comprises alkyl having 1-20 carbon atoms, X is N, a and b are 0 or 1 with the proviso that a+b=1, and n is 2-4.

10. The process of claim 8 wherein R1 is a radical of the formula:

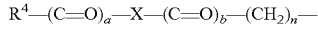

wherein $R^4$ comprises alkyl having 5-20 carbon atoms, X is N, a and b are 0 or 1 with the proviso that a+b=1, and n is 3.

11. The process of claim 8 wherein $R^2$ and $R^3$ are independently selected from saturated or unsaturated, branched or unbranched, cyclic or acyclic, alkyl or hydroxyalkyl radical having 1 to 4 carbon atoms.

12. The process of claim 8 wherein $R^2$ and $R^3$ are each independently selected from alkyl or hydroxyalkyl radicals having 1 to 2 carbon atoms.

13. The process of claim 1 wherein the fluoropolymer solids content in said aqueous fluoropolymer dispersion is about 10 to about 70 wt %.

14. The process of claim 1 wherein said surfactant for stabilization of the aqueous fluoropolymer dispersion is present in said fluoropolymer dispersion in an amount of about 0.05 to about 15 wt % based on the weight of fluoropolymer solids.

15. The process of claim 1 wherein said fluoropolymer of said aqueous fluoropolymer dispersion comprises a polymer selected from homopolymers and copolymers of tetrafluoroethylene.

16. The process of claim 1 wherein said fluoropolymer of said aqueous fluoropolymer dispersion is selected from polytetrafluoroethylene and modified polytetrafluoroethylene.

17. The process of claim 1 wherein said fluoropolymer of said aqueous fluoropolymer dispersion is a melt-processible copolymer comprising at least about 40-98 mol % tetrafluoroethylene units and about 2-60 mol % of at least one other monomer.

18. The process of claim 17 wherein said at least one other monomer comprises at least one perfluorinated monomer.

19. The process of claim 8 wherein if $R^2$, $R^3$ $R^4$ and $R^5$ of the amine oxide surfactant have halogen substitutions, said halogen substitutions are limited such that no more than 70% of the atoms attached to carbon atoms of the radical are halogen atoms.

* * * * *